United States Patent [19]

Tennick

[11] 4,382,450
[45] May 10, 1983

[54] FLOW CONTROL VALVE ASSEMBLY

[75] Inventor: Maurice Tennick, Newlandside, England

[73] Assignee: Sendair International Limited, Tyne & Wear, England

[21] Appl. No.: 241,041

[22] Filed: Mar. 6, 1981

[30] Foreign Application Priority Data

Mar. 8, 1980 [GB] United Kingdom ............... 8007931

[51] Int. Cl.³ .................. F16K 25/00; B08B 1/02; F16K 3/10
[52] U.S. Cl. .................................. 137/242; 251/172; 251/175; 251/298
[58] Field of Search ............... 137/242; 251/159, 160, 251/172, 175, 177, 298, 228, 180, 192, 193

[56] References Cited

U.S. PATENT DOCUMENTS

| 2,913,220 | 11/1959 | Cover | 137/242 |
| 3,047,006 | 7/1962 | Transeau | 251/177 |
| 3,076,631 | 2/1963 | Grove | 137/242 |
| 3,429,554 | 2/1969 | Pro | 251/175 |
| 3,506,238 | 4/1970 | Bertels | 251/193 |
| 3,528,448 | 9/1970 | Urban | 137/242 |
| 3,601,511 | 8/1971 | Massenbach | 251/172 |
| 3,765,440 | 10/1973 | Grove et al. | 251/246.22 |
| 4,137,935 | 2/1979 | Snowden | 137/242 |

FOREIGN PATENT DOCUMENTS

| 7141186 | 1/1972 | Fed. Rep. of Germany . |
| 2061076 | 6/1972 | Fed. Rep. of Germany . |
| 7305281 | 5/1973 | Fed. Rep. of Germany . |
| 1496696 | 12/1977 | United Kingdom . |

Primary Examiner—George L. Walton
Attorney, Agent, or Firm—Cushman, Darby & Cushman

[57] ABSTRACT

A flow control valve assembly for closing an inlet into a housing through which powdery or granular material is flowing and for sealing said inlet once closed, the assembly comprising a closure member movable within the housing from an inoperative position in which the inlet is open into a normal operative position closing said inlet, during which movement a deformable sealing ring mounted in the housing to surround the inlet wipes over, to clean, the closing surface of the closure member and to make initial sealing contact with the closure member. Inflation of the sealing ring against the closure member in its normal operative position then supplements the seal while, on subsequent pressurization of the interior of the housing, the closure member is displaced bodily within the housing axially towards the inlet to make increased contact with, to supplement further the seal with, the sealing ring.

9 Claims, 6 Drawing Figures

FLOW CONTROL VALVE ASSEMBLY

BACKGROUND OF THE INVENTION

This invention relates to valve assemblies and particularly to such assemblies for controlling the flow of solid materials, for example powdery, particulate or granular materials, through inlets into vessels, which vessels are subsequently to be pressurised to effect conveyance of the materials therefrom and whereby the inlets thereto must be sealed during said conveyance.

It is now established practice to convey granular or powdery materials by means of pneumatic conveying equipment in which the material is fed into a despatch vessel, said vessel then being supplied with compressed air which is utilised to transport the material from the vessel along an associated pipeline to a reception hopper.

In such equipment, it is necessary to provide a control valve arrangement in the feed path to the despatch vessel which can not only interrupt the flow of material to the vessel but which, on application of the pressure to the interior of the vessel, also effectively seals said interior of the vessel.

Heretofore, the valves associated with pneumatic conveying equipment have not been totally effective in achieving these two primary objectives.

In one known type of valve assembly, the closure member comprises a blade which co-operates with a lip seal around the inlet to the vessel. The pressure within the vessel serves to deform the lip of the seal against the blade and effect the necessary seal. However, there is a strong tendency for material to be trapped between the blade and lip seal causing leakage through the seal. Further, the presence of said material, which is commonly of an extremely abrasive nature, can, together with the friction on movement of the blade over the lip seal, result in eventual wear of the lip seal whereby an effective seal cannot thereafter be achieved.

It has been proposed to overcome these problems, in particular the wear of the seal, by providing a valve assembly with a deformable seal which can be inflated into contact with an associated closure member. However such assemblies do not eliminate the possibility of material being trapped between the closure member and the seal, and are consequently such that, on inflation, the seal must first penetrate the trapped material before contact with the closure member is made.

SUMMARY OF THE INVENTION

It is an object of the present invention to provide an improved flow control valve assembly which ensures an effective seal of a closure member over the inlet to a vessel even when the material being conveyed is abrasive and powdery or granular in composition and when the interior of the vessel is pressurised, typically up to 7 bars.

According to the present invention there is provided a valve assembly comprising a housing defining therein an inlet through which material can flow into said housing, a closure member mounted within the housing, said closure member having a closing surface and being movable between an inoperative position remote from the inlet and an operative position closing said inlet, the mounting of the closure member being such that, in its operative position, said member is displaceable axially of the inlet towards said inlet, a deformable sealing ring mounted on the housing to surround said inlet and having a sealing surface protruding into the housing, and means for deforming the sealing ring whereby, on deformation, said sealing surface protrudes further into the housing, the arrangement being such that, during displacement of the closure member from its inoperative position to its operative position, the closing surface of the closure member engages with the sealing surface of the sealing ring to be wiped thereby and to make initial sealing contact therewith, deformation of the sealing ring, with the closure member in its operative position, increasing the sealing contact between the sealing ring and the closure member, subsequent pressurisation of the interior of the vessel serving to displace the closure member towards the inlet to increase further the sealing contact between the deformed sealing ring and the closure member.

With such an arrangement it will be appreciated that initial movement of the closure member towards its operative position and through the material being supplied to the housing by way of the inlet results in wiping of the closure member by the sealing ring to provide a relatively clean surface on the clsoure member against which to seal. The deformation of the sealing ring then expands the sealing surface of the ring against the closure member to provide a supplementary sealing effect, while the subsequent pressurisation of the interior of the housing, typically to convey material therefrom, further intensifies the sealing effect by lifting the closure member towards the inlet and further compressing the sealing ring between the closure member and the housing.

Preferably the closure member includes a flat disc mounted for pivotal movement about an axis extending parallel with the central axis through the aperture, the sealing surface of the sealing ring lying in a plane perpendicular to said axes.

Conveniently the inlet to the housing is formed in a wall portion of the housing, said portion having formed in its internal surface an annular recess in which is located the sealing ring.

The sealing surface of the sealing ring protruding into the housing is preferably outwardly convex in transverse section.

Deformation of the sealing ring whereby the sealing surface protrudes further into the housing may be achieved by inflating the sealing ring with compressed gas applied to the surface of the ring within the wall portion and remote from the sealing surface.

Conveniently the sealing ring is of generally V-shape in transverse section, with the base of the section being outwardly convex, the annular recess in the wall portion of the housing being of corresponding section and including a pair of receiving channels, one for each arm of the sealing ring, separated by a central anvil part of the wall portion.

With such an arrangement, the compressed gas for inflating the seal is conveniently fed through a bore in the anvil part and into the recess to impinge the surface of the sealing ring remote from the sealing surface adjacent the junction of said arms to expand the ring outwardly of the recess.

Preferably the flat disc of the closure member is removably mounted on a carrier portion of the closure member, while the wall portion carrying the sealing ring may be integrally formed with the housing or, preferably, may comprise a support ring removably mounted on the housing.

DESCRIPTION OF THE PREFERRED EMBODIMENT

Figure 1:
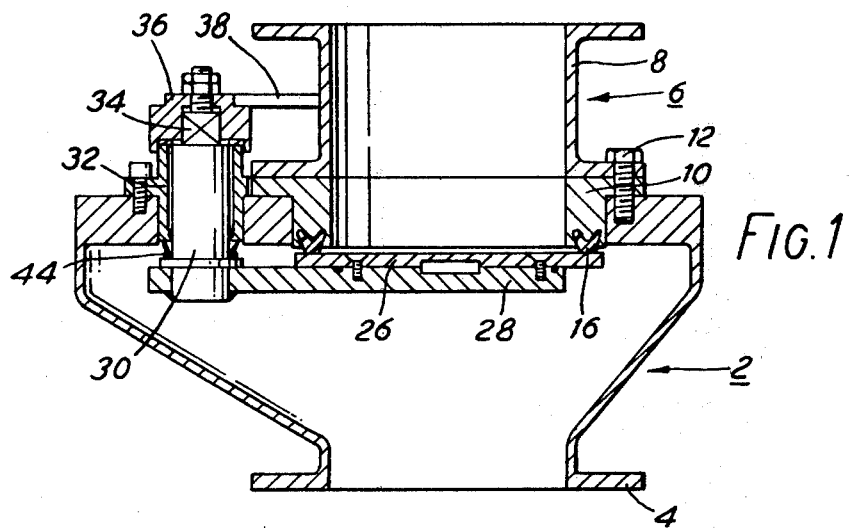
FIG. 1 is a vertical section through a valve assembly according to the invention.
Figure 2:
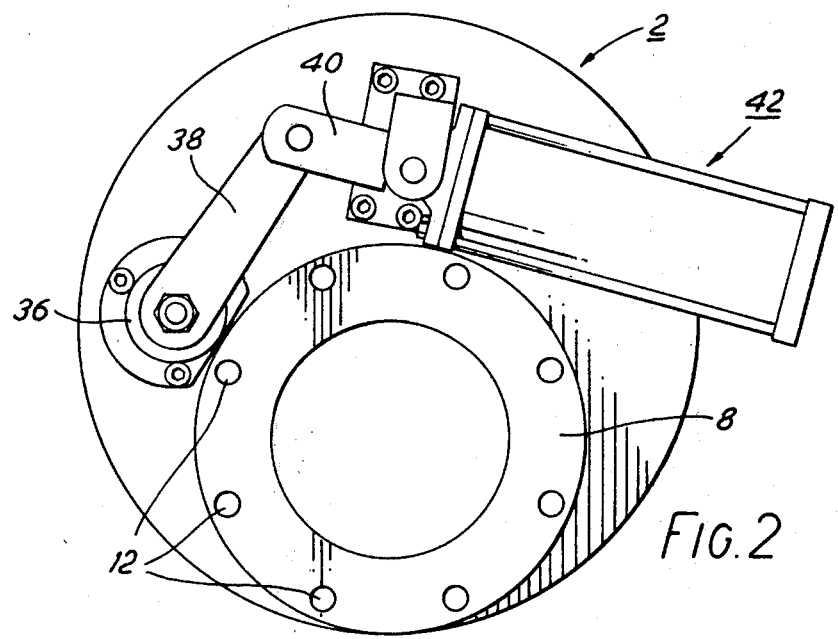
FIG. 2 is a plan view from above of the assembly of FIG. 1.

Referring to the drawings, the illustrated assembly comprises a housing indicated generally at 2 the lower end flange 4 of which is adapted for attachment to a despatch vessel of a pneumatic conveying system. Bulk material such as powdery or granular materials can be fed into the housing 2, and thence to the despatch vessel, through an inlet member indicated generally at 6 removably located in an aperture in the top of the housing 2.

More particularly, the inlet member 6 includes a hollow cylindrical portion 8 into the upper end of which material can be fed, and a support ring 10 the bore of which forms a continuation of that of the portion 8. The portion 8 and support ring 10 are secured together and to the top of the housing 2 by a series of screws 12 with the ring 10 lining the aperture in the top of the housing 2 and with the lower surface of the support ring located slightly below the lower surface of the top of the housing 2.

An annular recess 14 is formed in the lower surface of the support ring to surround the aperture in the top of the housing 2, a sealing ring 16 of, for example, a rubber plastics material which is both resilient and hard-wearing being located in said recess.

More particularly, the sealing ring 16 is of generally V-shape or swallow-tail shape in transverse section, including a pair of tapering arm portions 18,20 and a base portion having an outwardly convex surface 22.

The recess 14 in the support ring 12 is of complementary shape, including a pair of receiving channels, one for each arm portion 18,20, separated by a central anvil 24 integrally formed in the support ring 12.

Figure 3:
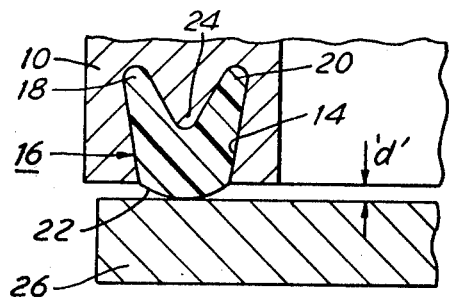
FIGS. 3 to 6 are vertical sections through part of the sealing ring of the assembly of FIGS. 1 and 2 at various stages during the pressurisation cycle.

With the sealing ring 16 located in the support ring 12, the outwardly convex surface 22 protrudes from the support ring 12, as best seen in FIG. 3, and into the housing for reasons to be detailed below.

A bore (not shown) is formed through the anvil 24 to communicate into the recess 14 at the junction of the receiving channels of said recess, a source of compressed gas, conveniently compressed air, being connected to said bore again for reasons to be detailed below.

The valve assembly further comprises a closure mechanism for closing and sealing the bore through the support ring 10 and therefore the interior of the housing 2. Said closure mechanism includes a closure member in the form of a flat disc 26 removably secured on a carrier plate 28 as best seen in FIG. 1. The plate 28 is mounted for pivotal movement in a horizontal plane about a vertical axis by means of a pivot shaft 30 rigidly secured to said plate 28. The shaft 30 is received within a cylindrical bearing member 32 extending through and secured to the top of the housing 2.

The end of the shaft 30 outside the housing 2 comprises a square-section drive portion 34 onto which is located a cap portion 36 provided with a receiving recess therein of corresponding square-section, said portion 34 forming one end of a connecting shaft 36. The other end of the shaft 38 is pivotally connected to the piston-rod 40 of a piston-cylinder assembly 42 which may be hydraulically or pneumatically operated.

Thus it will be appreciated that, on linear movement of the piston rod 40, the connecting shaft 38 is pivoted to rotate the cap portion 36 and with it the shaft 30 and attached carrier plate 28 and disc 26 whereby said disc is swung in a horizontal plane within the housing 2.

An important feature of the illustrated assembly is that the disc 26 is movable axially towards the support ring 10 from the normal operative position shown in FIG. 1 and 3. In this normal operative position, which is the lowermost position of the disc 26 within the housing 2, the width of the gap 'd' (FIG. 3) between the upper surface of the disc 26 and the lower surface of the support ring 10 is slightly less than the maximum distance by which the convex surface 22 of the sealing ring 16 protrudes from said lower surface of the support ring 10. Thus, in said normal operative position of the disc 26 there is initial sealing contact between the sealing ring 16 and the disc 26.

The ability for the disc 26 to move axially towards the ring 10 is achieved by virtue of the mounting of the shaft 30 within the bearing member 32 and cap 34, which is such as to permit sliding movement of said shaft relative to the fixed bearing member over an axial distance at last equal to the gap 'd'. A resilient, deformable sealing ring 44 ensures an air-tight seal round the shaft 30 in all axial positions of said shaft.

In use, the illustrated assembly is secured, by way of the flange 4, to the top of a despatch vessel forming part of a pneumatic conveying system and from which vessel highly abrasive materials such as dry silica sand or coal dust or bentonite are to be despatched. The disc 26 is located, by suitable actuation of the piston-cylinder assembly 42, in an inoperative position remote from the bore through the support ring 10 to permit the material to be fed into the despatch vessel through the inlet member 6.

When a predetermined level in the vessel is reached, the piston-cylinder assembly 42 is actuated to swing the carrier plate 28 and disc 26 into the normal operative position shown in FIG. 1. During this swinging movement, the protruding convex surface 22 of the sealing ring 16 performs a wiping action on the upper surface of the disc 26 to remove material therefrom as said disc cuts through the incoming material in its movement towards the operative position whereby, with the disc 26 in its normal operative position closing the bore through the support ring 10, the sealing ring 16 makes initial sealing contact with a clean, material-free surface of the closure mechanism.

Figure 4:
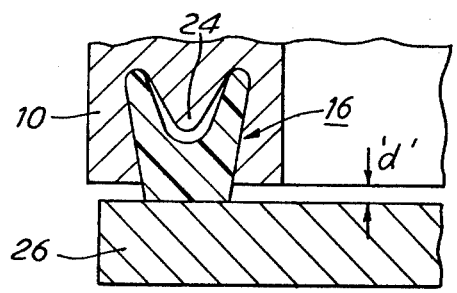

Compressed air is then fed through the bore in the anvil 24 into the recess 14 in the support ring 10 to impinge upon the surface of the sealing ring 16 remote from the surface 22 and inflate said sealing ring as shown in FIG. 4 whereby the sealing contact between the surface 22 of the sealing ring 16 and the disc 26 is increased.

Figure 5:
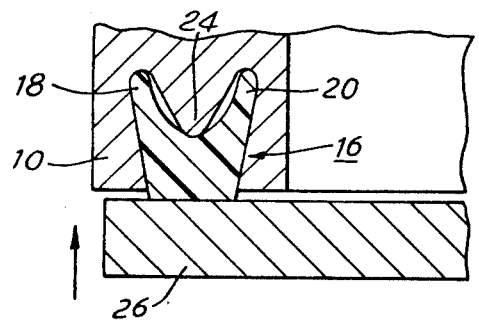

High pressure air is then introduced into the despatch vessel at a controlled rate and such that the material in the vessel is moved from the vessel into a conveying pipe-line. This increased air pressure within the vessel lifts the carrier plate 28 and disc 26 towards the support ring to intensify further the sealing contact between the disc and the sealing ring as shown in FIG. 5, the sealing ring being compressed between the disc and the fixed anvil 24 of the support ring 10.

Figure 6:
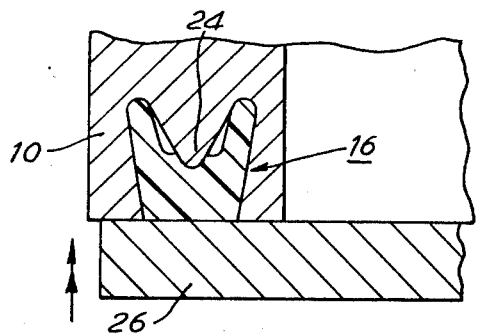

As the conveying pressure within the vessel continues to increase the disc 26 lifts further until it eventually makes metal to metal contact with the support ring 10 as shown in FIG. 6, the mounting of the shaft 30 in the bearing member 32 being such as to accommodate this maximum axial movement of the disc 26.

Thus there is provided a valve assembly in which the closure mechanism of the valve can be swung aside to provide a completely clear filling aperture into a despatch vessel, actuation of the piston cylinder assembly resulting in a powerful shearing action of the closure mechanism through the material as the valve is closed.

The disc 26 is a wear-prone component preferably manufactured from a hard, corrosion resistant material and, because of its removable mounting of the carrier plate 28, it can be readily replaced or re-located on said plate 28.

The arrangement is such as to ensure that sealing is effected against a clean surface of the closure mechanism, the sealing effect being built up in three stages—i.e. initial sealing due to contact of the sealing ring with the disc 26, followed by inflation of the sealing ring to supplement the initial seal, lifting of the disc due to pressurisation of the despatch vessel then completing the seal.

Like the disc 26, the support ring 10 can readily be removed from the assembly to enable easy replacement of the sealing ring 16. Said sealing ring 16 may be bonded in the recess 14 or may be a loose fit therein.

Although illustrated as an attachment for a despatch vessel, the illustrated assembly may be built into, to be an integral part of, the despatch vessel.

Preferably the precise location of the disc 16 relative to the support ring 10 with the disc 26 in its normal operative position is adjustable in the vertical plane to ensure a suitable initial gap 'd' for the material being handled whilst still retaining the wiping contact of the sealing ring with the disc during the closing movement. The clearance is typically 2 to 3 mm and is sufficient to avoid particles of material jamming the mechanism during opening and closing.

What I claim and desire to secure by Letters Patent is:

1. A valve assembly comprising a housing defining therein an inlet through which material can flow to the housing, a closure member having a planar closing surface and being mounted within the housing to be movable between an inoperative position remote from the inlet and an operative position aligned with the inlet, said closure member being mounted in the housing such that the plane of the closing surface is axially spaced from the inlet and such that the closure member is displaceable axially of the inlet towards said inlet, said spacing between the closing surface of the closure member and the inlet being adjustable, the valve assembly further comprising a deformable sealing ring mounted on the housing to surround said inlet and having a sealing surface protruding into the housing, and means for deforming the sealing ring whereby, on deformation, said sealing surface protrudes further into the housing, the arrangement being such that, during displacement of the closure member from its inoperative position to its operative position, the closing surface of the closure member first engages with the sealing surface of the sealing ring to be wiped thereby and to make initial sealing contact therewith, secondly, deformation of the sealing ring by the deforming means, with the closure member in its operative position, increasing the sealing contact between the sealing ring and the closure member, thirdly, subsequent pressurisation of the interior of the vessel serving to adjustably displace the closure member towards the inlet to increase further the sealing contact between the deformed sealing ring and the closure member, and sufficent pressurization serving to sealingly engage the valve closure member with the housing after the sealing ring has been fully deformed.

2. A valve assembly as claimed in claim 1 in which the closure member includes a flat disc mounted for pivotal movement about an axis extending parallel with and displaced from the central axis through the inlet, the sealing surface of the sealing ring lying in a plane perpendicular to said axes.

3. A valve assembly as claimed in claim 2 in which the closure member includes a carrier portion on which the flat disc of the closure member is removably mounted.

4. A valve assembly as claimed in claim 1 in which the housing comprises a wall portion in which is formed the inlet to the housing, said portion having an internal surface in which is formed an annular recess, the sealing ring being located in said recess.

5. A valve assembly as claimed in claim 4 in which the sealing ring is of generally V-shape in transverse section, having a pair of arm portions thereto, with the base of the section being outwardly convex, the annular recess in the wall portion of the housing being of corresponding section and including a pair of receiving channels, one for each arm of the sealing ring, a central anvil part of the wall portion separating said arm portions.

6. A valve assembly as claimed in claim 5 in which the means for deforming the sealing ring comprises a source of compressed gas applied to a surface of the sealing ring within the wall portion and remote from the sealing surface to inflate the ring whereby the sealing surface thereof protrudes further into the housing.

7. A valve assembly as claimed in claim 6 in which the anvil part is provided with a bore through which the compressed gas for inflating the sealing ring is fed into the recess in the wall portion to impinge the surface of the sealing ring remote from the sealing surface adjacent the junction of the arm portions of the sealing ring to expand the ring outwardly of the recess.

8. A valve assembly as claimed in claim 4 in which the wall portion carrying the sealing ring comprises a support ring removably mounted on the housing.

9. A valve assembly as claimed in claim 1 in which the sealing surface of the sealing ring protruding into the housing is outwardly convex in transverse section.

* * * * *